(12) United States Patent
Imes

(10) Patent No.: US 6,474,270 B1
(45) Date of Patent: Nov. 5, 2002

(54) LEASH FOR MULTIPLE DOGS

(76) Inventor: Mary Lynn Imes, 3025 Sawtooth, Plano, TX (US) 75025

( * ) Notice: Subject to any disclaimer, the term of this patent is extended or adjusted under 35 U.S.C. 154(b) by 0 days.

(21) Appl. No.: 10/047,752

(22) Filed: Oct. 20, 2001

(51) Int. Cl.[7] .......................... A01K 27/00; B65H 75/34
(52) U.S. Cl. ........................ 119/796; 254/409; 119/794; 119/770
(58) Field of Search ................................. 119/770, 784, 119/712, 794, 796, 797, 798, 795; D30/153; 242/382; 254/399, 401, 409

(56) References Cited

U.S. PATENT DOCUMENTS

| | | | |
|---|---|---|---|
| 502,954 A | * | 8/1893 | Crepeau |
| 4,667,625 A | * | 5/1987 | Malone ...................... 119/120 |
| 4,879,972 A | | 11/1989 | Crowe et al. |
| 4,892,063 A | | 1/1990 | Garrigan |
| 5,213,063 A | * | 5/1993 | Franck ........................ 119/120 |
| 5,483,926 A | * | 1/1996 | Bogdahn .................... 119/796 |
| 5,497,732 A | * | 3/1996 | Moffre et al. ............... 119/784 |
| 5,632,234 A | * | 5/1997 | Parker ........................ 119/795 |
| 5,701,848 A | | 12/1997 | Tozawa |
| D391,694 S | * | 3/1998 | Eichhorn ................... D30/153 |
| 5,852,988 A | | 12/1998 | Gish |
| 5,890,456 A | * | 4/1999 | Tancrede .................... 119/794 |
| 5,901,668 A | | 5/1999 | Goodger, Sr. |
| 6,223,695 B1 | | 5/2001 | Edwards et al. |
| 6,237,539 B1 | | 5/2001 | Sporn |
| 6,273,029 B1 | | 8/2001 | Gish |

FOREIGN PATENT DOCUMENTS

EP 0464725 A1 * 6/1991 .......... A01K/27/00

OTHER PUBLICATIONS www.flexiusa.com/freedom, Flexi Freedom on the Flexi leash, 3 pages.*

* cited by examiner

*Primary Examiner*—Peter M. Poon
*Assistant Examiner*—Andrea M. Valenti
(74) *Attorney, Agent, or Firm*—John Glenn Meazell

(57) ABSTRACT

An improved dog leash for use with two or more dogs that enables two dogs to be walked simultaneously. The invention resists tangling and is designed to minimize the effect each dog has on each other in the natural course of the inventions use. Moreover, the invention takes into account the natural predilections of dogs in that the leash allows the dogs to roam more freely. However, the invention also accounts for the differences in the strength, size and activity of each dog attached to the invention by minimizing the effect each dog has on the other.

8 Claims, 1 Drawing Sheet

LEASH FOR MULTIPLE DOGS

BACKGROUND OF THE INVENTION

1. Field of the Invention

The present invention relates to a pet leash and more particularly to a pet leash used in connection with walking multiple pets simultaneously.

2. Description of the Prior Art

Many people own dogs and in fact own multiple dogs. One of the niceties and/or necessities in owning such an animal is taking the dogs for a walk. This usually entails the use of a leash, and when multiple dogs are owned the owner must resort to either using more than one conventional leash or a leash specifically designed to handle more than one dog.

A variety of inventions have been created to cater to the walking of multiple dogs using a leash having but one handle. The advantages of having a single handle for multiple dogs is chronicled in various patents such as Parker, U.S. Pat. No. 5,632,234, Tozawa U.S. Pat No. 5,702,848, Crowe et. al. U.S. Pat. No. 4,879,972, Gish U.S. Pat. No. 5,852,988 as well as others. However, Parker '234 illuminated the deficiencies with the previous designs and whose design addressed those shortcomings. Although the '234 patent resolved some the problems the previous designs failed to correct, the '234 patent had limitations of its own. The invention identified herein resolves those limitations through a refined design using an existing product.

All of the previously identified patents attempt to relieve the stresses induced upon the owner when two leashes are used. As the '234 patent states, the previous designs fail to take into account when two dogs desire to roam in different directions. It is common that two dogs being held by their owner will naturally roam in different directions. The '234 patent attempted to resolve the issues confronted by an owner of multiple dogs by addressing not only the stresses placed on the owner but also considering the natural predilections of dogs to roam in different directions and to roam at different paces. The current embodiment attempts to resolve this issue by creating a second point of flexibility, that is, a retracting means held and manipulated by the owner.

Further, the '234 patent identified the need to design a leash to account for the different activity levels, strength and sizes of dogs. The '234 patents specifically addressed the needs of the animals and not just the owner. Nonetheless, the '234 patent failed to address an active small dog being walked with a larger active dog. To accomplish resolving the problems of the previous designs, the '234 patent relied on a single elongated pet lead in which the two animals would be attached to either end. Unfortunately, when the first animal would move in a direction opposite the second animal, the second animal would be pulled in the direction of the first animal. Consequently, when the elongated pet lead becomes taunt the larger or more stronger dog would tend to drag the smaller dog in the direction of the larger animal. Furthermore, even if the dogs were of the same size and strength, once the dogs found themselves in the situation above, the '234 design can no longer resolve the deficiencies it sought to alleviate from the previous designs.

In addition, the '234 design does not account for the urban dweller who often will walk their dogs to a park where they may roam more freely. An owner is lives in an urban area will find that at times he must keep the dogs on a short leash. The '234 patent has a static length thereby allowing one or more of the dogs to roam into dangerous situations.

Thus, there remains a need for a new and improved design which more aptly accounts for the differences in size, strength and activities of the dog. Further, a need remains to allow the dogs greater freedom to roam independently of one another while allowing the owner to adjust this freedom as he so wills.

SUMMARY OF THE INVENTION

In view of the foregoing disadvantages inherent in the known types of multiple dog leashes now present in the prior art, the present invention provides a new dog leash for use with multiple dogs which not only reduces the stresses incurred by the owner in walking such animals, but also allows dogs of different strengths, sizes and activity levels greater independence of one another. Further, the current embodiment permits the owner to reduce the freedom enjoyed by the dogs in one integral unit.

To attain this, the present invention partially comprises a leash that automatically retracts and releases a dog leash which is commercially available as a product known as Flexi-2® Other commercially available products exist which have the same basic characteristics as the Flexi-2® and any suitable leash which has a retracting means for retracting and releasing a leash may be similarly used. Similar devices as the Flexi-2® are described in such patents as U.S. Pat. Nos. 3,693,596, 3,937,418 and 4,562,792. The retractable leash is comprised of a narrow cord whose one end is attached to a retracting means for retracting and releasing the narrow cord which is contained within the body of the retractable leash. The retracting means is generally comprised of a spool and a spring means attached to said spool to force said spool to rotated in a manner coiling the narrow cord. However, other variations may exist. The other end of the narrow cord is attached to a pulley stop. The pulley stop is then connected to one end of a first nylon strap. The opposite end of the first nylon strap is attached to a first fastener the type of which is commonly used to connect to a dog collar nor the body of the retractable leash. The retracting means not only automatically retracts the leash but also permits the leash to be released when one or more of the dogs exerts tension on the narrow cord.

The second part of the current embodiment is a second leash having a second nylon strap in which one end of the second nylon strap is attached to a second fastener, the type of which is commonly used to connect to a dog collar. The other end of the second nylon strap is attached a pulley. The pulley runs over the narrow cord but cannot traverse the pulley stop.

The invention is used by connecting the first fastener to the collar of one dog and connecting the second fastener to the collar of another dog. The dogs, irrespective of their size, strength or activity levels roam in different directions. As the dogs begin to exert tension on their respective nylon straps, the tension is minimized by the release of the narrow cord from the retractable leash. Only when the narrow cord is completely released by the retractable leash may the dogs have a direct effect on one another.

The owner has the ability to change the length in which the dogs may roam by retracting the narrow cord into the body of the retractable leash. This owner has greater control over the freedom of the animals within seconds. This protects the animals and the owner while allowing the owner to permit the dogs to roam more freely when the space permits.

The current embodiment permits the dog attached to the second fastener to run the length of the narrow cord with hindrance so long as this dog does not exert any tension on the narrow cord. However, the current embodiment additionally addresses the situation in which the dog attached to the second fastener exert tension on the narrow cord by providing a release point via the retracting means for the retracting and releasing of the narrow cord of the retractable leash. By permitting the release of the narrow cord by the retracting means for the retracting and releasing of the narrow cord, when the dog attached to the second fastener exerts tension on the narrow cord, the other dog does not feel any appreciable pull.

Accordingly, one object of the present invention is to reduce the stresses on the owner when walking two dogs.

Another object of the present invention is provide greater control to the owner to direct the level of freedom enjoyed by the dogs while allowing one dog freedom to roam with minimal effect by the other dog.

Another object of the present invention is to allow two or more dogs having different strengths, sizes, or activity levels to roam more freely without interference by the other dog or dogs.

Another object of the present invention is to provide a pet leash for multiple dogs without tangling of the leash.

Another object of the present invention is to provide a multiple pet leash whose various leashes automatically self adjusts in such a way to minimize the influence of one pet on another.

Another object of the present invention is to provide a multiple pet leash whose various leashes automatically self adjusts to allow greater roaming by one or more animals.

Another object of the present invention is to provide a multiple pet leash whose various leashes automatically self adjusts to allow greater roaming by one or more animals, and whose distance of roaming can be adjusted by the owner with relative ease.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The invention will be better understood and objects other than those set forth above will become apparent when consideration is given to the following detailed description thereof. Such description makes reference to the annexed drawing wherein.

DESCRIPTION OF PREFERRED EMBODIMENTS

Figure 1:
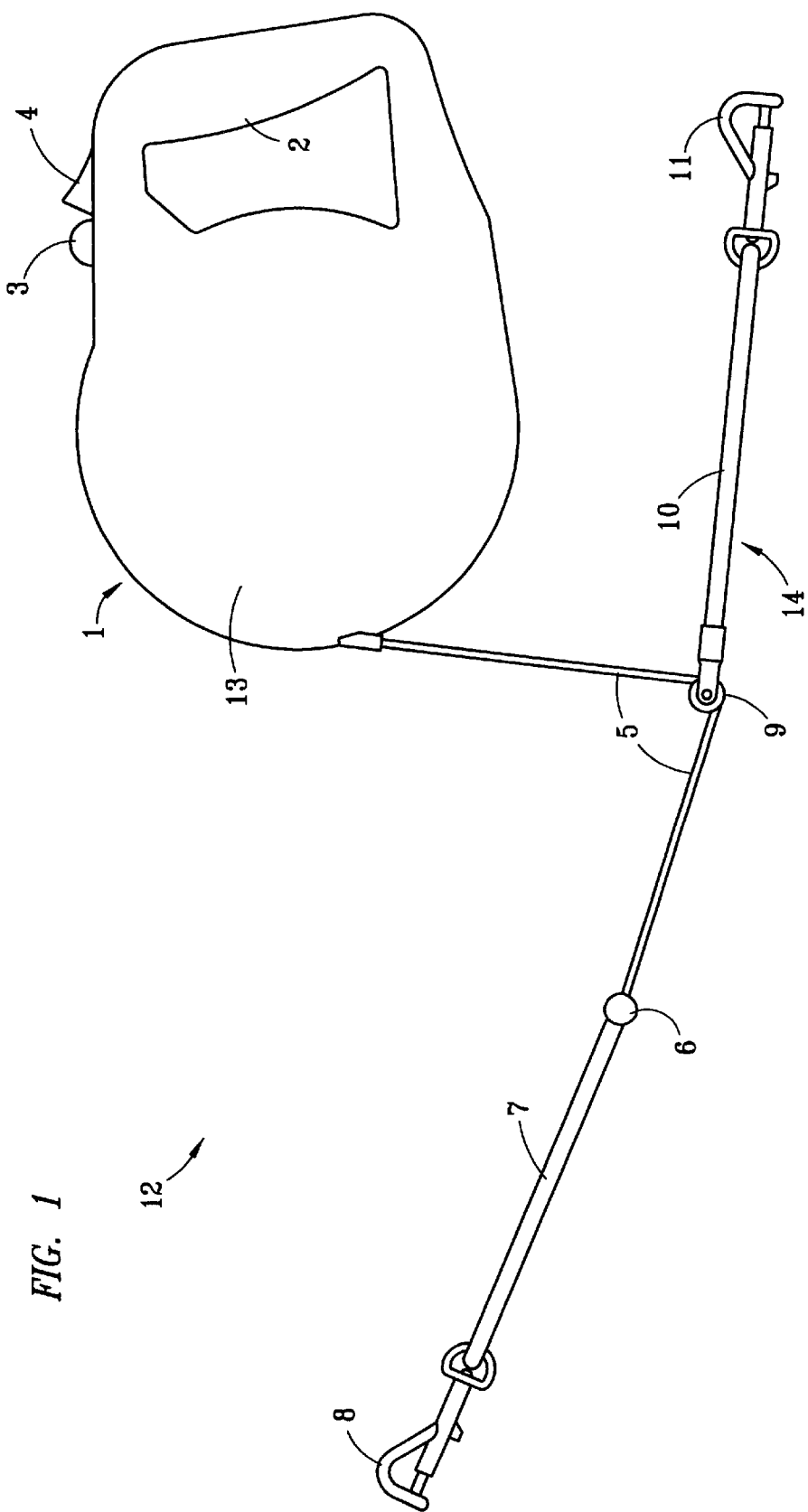
FIG. 1 is a side view of the present invention.

With reference now to the drawing, a Leash for Multiple Dogs embodying the principles and concepts of the present invention and generally designated by the reference numeral 12 will be described.

It can be seen from FIG. 1 that the Leash for Multiple Dogs 12 is comprised of a retractable leash 1 having a body 13 and a handle 2 with a retractable cord lock 3 and retractable cord brake 4. Contained with the body 13 is a retracting means for retracting and releasing a narrow cord 5 having two ends. The narrow cord 5 can be any suitable length but the preferred embodiment contemplates between fifteen and twenty-five feet. One end of the narrow cord 5 is placed through an aperture on the body 13 and attached to the retracting means. The other end of the narrow cord 5 is attached to a pulley stop 6. The pulley stop 6 in turn is attached to one end of a first nylon strap 7 having two ends. The opposite end of the first nylon strap 7 is attached to a first fastener 8. A second leash 14 is comprised of a second nylon strap 10 having two ends. A second fastener 11 is attached to one end of the second nylon strap. A pulley 9 is attached to the other end of the second nylon strap 10. The narrow cord 5 is threaded through the pulley 9 such that the pulley 9 rides along the narrow cord 5. Devices serving the same purpose of the pulley 9 may be used instead. Further, the nylon straps 7, 10 may be any length but the preferred embodiment would set the length at four feet.

The present embodiment is used by attaching the collar of one dog to the first fastener 8 and the collar of a second dog to the second fastener. As the owner walks the dogs, the owner can release as much of the narrow cord 5 as he desires. The narrow cord 5 is as long as twenty-five feet but obviously can be made shorter or longer. The range of roaming of the two dogs is dictated by the length of the narrow cord 5 released by the owner.

When the owner walks the dogs in areas where distant range or motion would pose a hazard to the animals or others, the owner can retract the narrow cord 5, thereby restricting the range of motion of the animals. When the owner finds himself in an area that affords the animals maximum range of motion, he may allow the narrow cord 5 to be fully released.

Since the second nylon strap 10 rides on the narrow cord 5 via the pulley 9, the dogs attached to the first fastener 8 and the second fastener 11 may move independently of one another so long as the narrow cord 5 is not fully released nor the retractable cord brake 4 applied nor the retractable cord lock 3 applied. This retractable leash 1 maintains a slight tension on first nylon strap and second nylon strap by automatically rewinding the narrow cord 9 into the body 13. This causes the nylon straps 7, 10 to remain elevated toward the retractable leash 1. This constant elevation prevents the tangling of the nylon straps 7, 10. Once either dog moves, the retracting means will release the narrow cord 9 to accommodate the moving dog or dogs. Only when the narrow cord 9 is fully released may either dog feel a direct effect from each others activities. Of course, if the retractable cord lock 3 or retractable cord brake 4 are applied, the dogs may affect one another. However, the retractable cord lock 3 is applied and the retractable cord brake 4 is intended to be used when the space does not permit free roaming.

The first fastener 8 and second fastener 11 may swivel to prevent tangling of the narrow cord 5 or the first nylon strap 7 or the second nylon strap 10.

It would be obvious for those trained in the art that more than one second leash 14 may be interposed between the two ends of the narrow cord 5. In addition, the preferred embodiment would require the first nylon strap 7 and the second nylon strap 10 be of equal length, although it is not necessary that the nylon straps 7, 10 be of equal length. The advantage of having the nylon straps 7, 10 being of equal length is when only one dog is being walked the owner may simply attach both fasteners 8, 11 to the collar of the one dog, thereby eliminating either the removal of the second leash 15 or the dragging of one of the nylon straps 7, 10 on the ground due to unequal length.

As further illustration, the pulley 9 may be constructed such that it may be removed from the narrow cord 5 and reinstalled onto the narrow cord 5. This can also be accomplished by sliding the pulley stop 6 up the narrow cord 5 and releasing the narrow cord 5 from the first nylon strap 7. The narrow cord 5 can then be threaded through the pulley 9 and the narrow cord 5 reattached by reversing the process previously described.

As to further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved leash for multiple dogs comprising:
    a) a retractable leash including:
        i) a body having an aperture;
        ii) a handle;
        iii) a narrow cord having two ends;
        iv) one end of the narrow cord connected through the aperture of the body to a retracting means for the retracting and releasing of the narrow cord contained within the body and the other end of the narrow cord connected to a pulley stop;
        v) a first nylon strap having two ends wherein one end is connected to the pulley stop and the other end is connected to a first fastener;
    b) a second leash including:
        i) a pulley in which the narrow cord is threaded therethrough, whereby the pulley rides along the narrow cord;
        ii) a second nylon strap having two ends;
        iii) one end of the second nylon strap connected to the pulley and the other end of the second nylon strap connected to a second fastener.

2. The new and improved leash for multiple dogs described in claim 1 and further including:
    a) a retractable cord lock means preventing the retraction or extension of the narrow cord.

3. The new and improved leash for multiple dogs described in claim 1 and further including:
    a) a retractable cord brake means for preventing the retraction or extension of the narrow cord.

4. The new and improved leash for multiple dogs described in claim 1 wherein the first fastener and second fastener swivel.

5. The new and improved leash for multiple dogs described in claim 1 wherein the pulley is removable from the narrow cord and replaceable on the narrow cord.

6. The new and improved leash for multiple dogs described in claim 1 wherein the first nylon strap and the second nylon strap are of equal length.

7. The new and improved leash for multiple dogs described in claim 1 and further including:
    a) a third leash including:
        i) a second pulley interposed the two ends of the narrow cord, whereby the pulley rides along the narrow cord;
        ii) a third nylon strap having two ends;
        iii) one end of the third nylon strap connected to the second pulley and the other end of the third nylon strap connected to a third fastener.

8. A new and improved leash for multiple dogs comprising:
    a) a retractable leash
        i) a body having an aperture;
        ii) a handle;
        iii) an narrow cord having two ends;
        iv) a retractor
        iv) one end of the narrow cord connected through the aperture of the body to a retracting means for the retracting and releasing of the narrow cord contained within the body and the other end of the narrow cord connected to a pulley stop;
        v) a first nylon strap having two ends wherein one end is connected to the pulley stop and the other end is connected to a first fastener;
    b) a second leash including:
        i) a pulley in which the narrow cord is threaded therethrough, whereby the pulley rides along the narrow cord;
        ii) a second nylon strap having two ends;
        iii) one end of the second nylon strap connected to the pulley and the other end of the second nylon strap connected to a second fastener.

* * * * *